United States Patent [19]
Boulet et al.

[11] Patent Number: 5,344,575
[45] Date of Patent: Sep. 6, 1994

[54] APPARATUS AND METHOD FOR EXTRACTING LIQUID FROM A HUMID MASS

[75] Inventors: Rodrigue Boulet, Ville Duberger; Adrian Barbulescu, Pierrefonds; Jean-Paul Charland, Charlesbourg, all of Canada

[73] Assignee: Centre de Recherche Industrielle du Quebec, Ste-Foy, Canada

[21] Appl. No.: 10,851
[22] Filed: Jan. 29, 1993
[51] Int. Cl.$^5$ .............................................. B01D 33/21
[52] U.S. Cl. .................................... 210/780; 210/450
[58] Field of Search .................... 55/21, 52, 199, 203; 210/780, 450, 331

[56] References Cited
U.S. PATENT DOCUMENTS
5,017,198  5/1991  Schieg et al. ............................ 55/21

*Primary Examiner*—Frank Spear

[57] ABSTRACT

The present invention relates to an apparatus for extracting liquid from a humid mass. The apparatus comprises a cylindrical housing having a first and a second end wall and a cylindrical side wall. At least one inlet is provided for admitting said humid mass in the housing. A pumping system is also provided for forcing said humid mass into the inlet. A rotor has one or more pairs of side walls, which are joined to a bottom wall and define one or more channels open at their periphery in at least a portion thereof. One or more rotor side walls are provided with perforations. The rotor has a central shaft for rotation with respect to the housing, this shaft having a conduit extending longitudinally therethrough, and is provided with one or more draining conduits having a first portion in fluid communication with the perforations. One or more rotor side walls are moved upon rotation of the central shaft. The draining conduit has a second portion in fluid communication with the shaft conduit. A drive is connected to the shaft for rotating the rotor and the apparatus is provided with one or more outlets for discharging matter containing a reduced percentage of liquid therein upon rotation of the rotor, the channel being in direct communication with the shaft conduit.

43 Claims, 13 Drawing Sheets

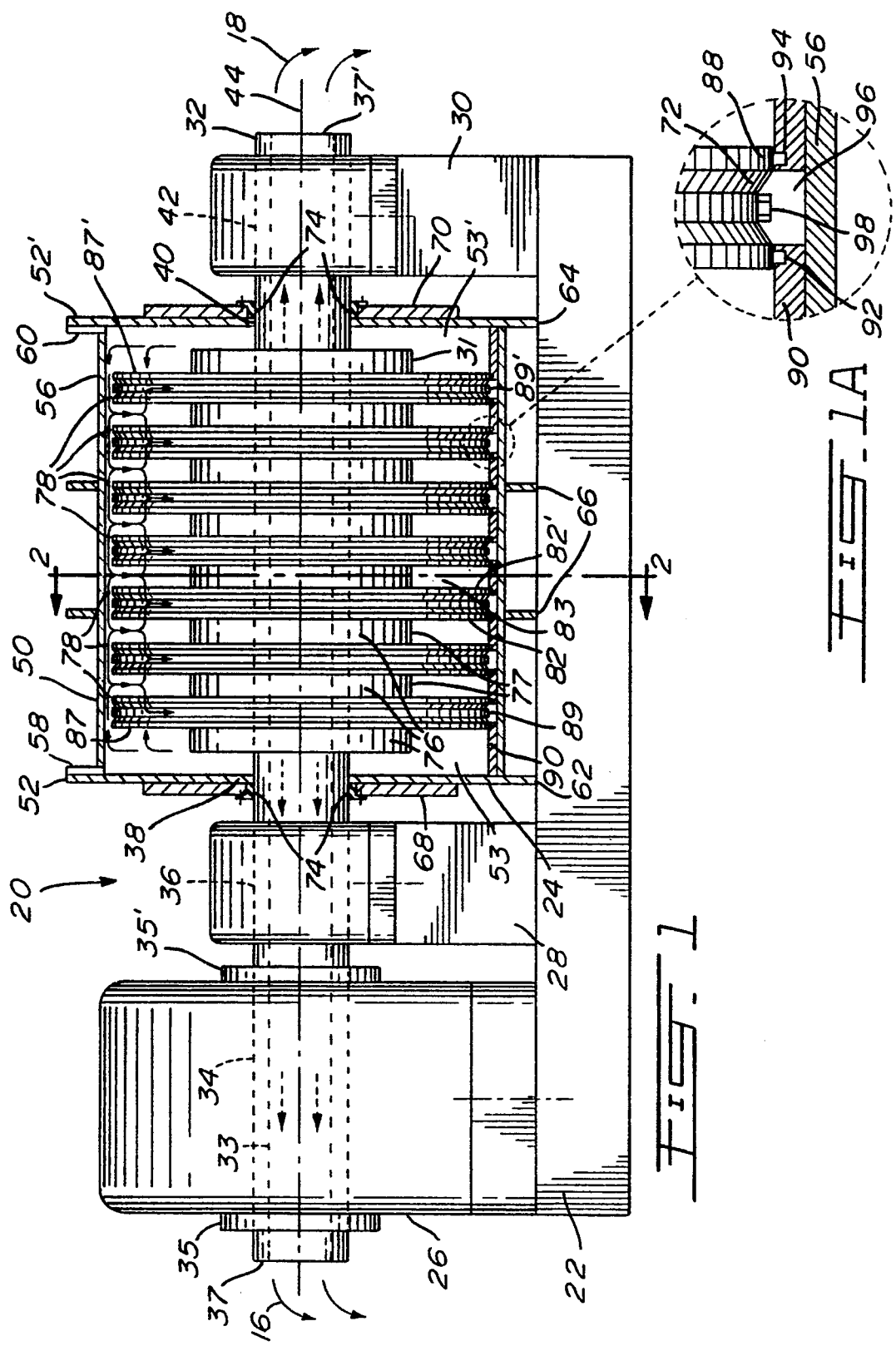

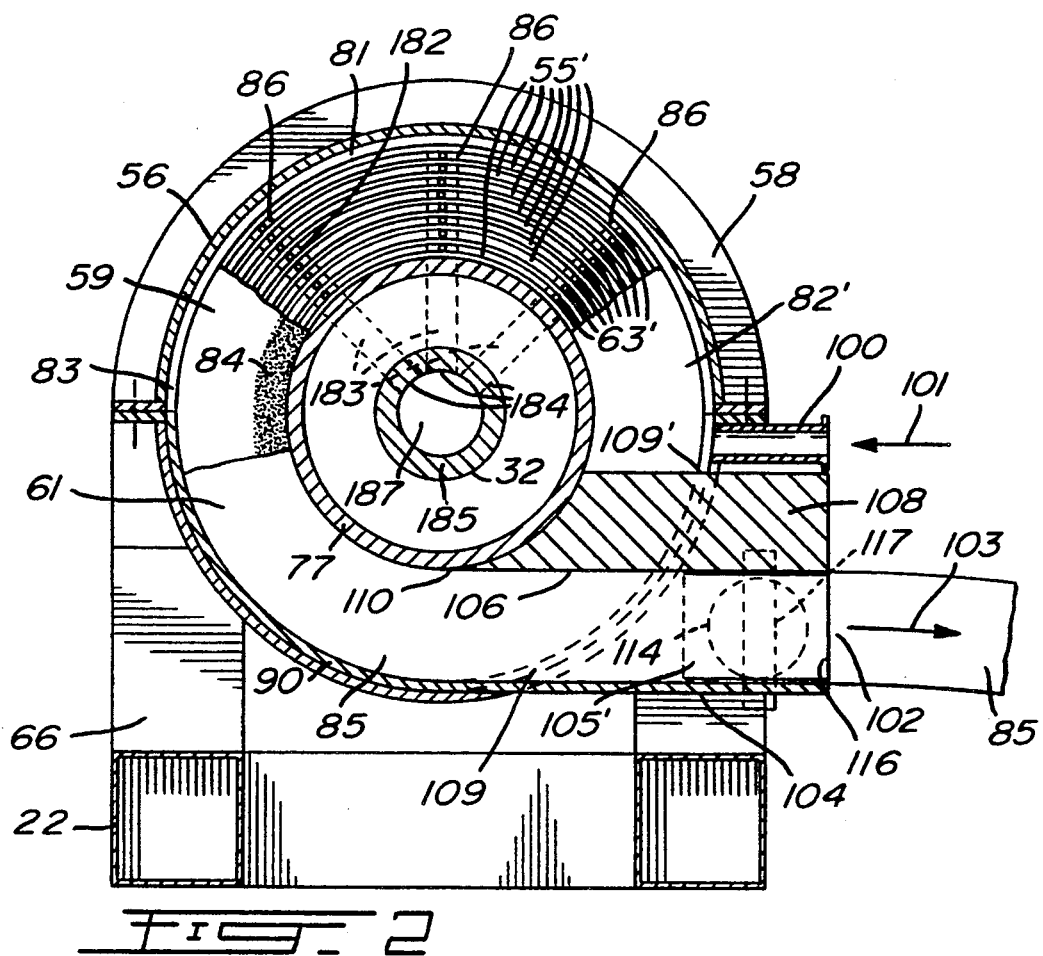
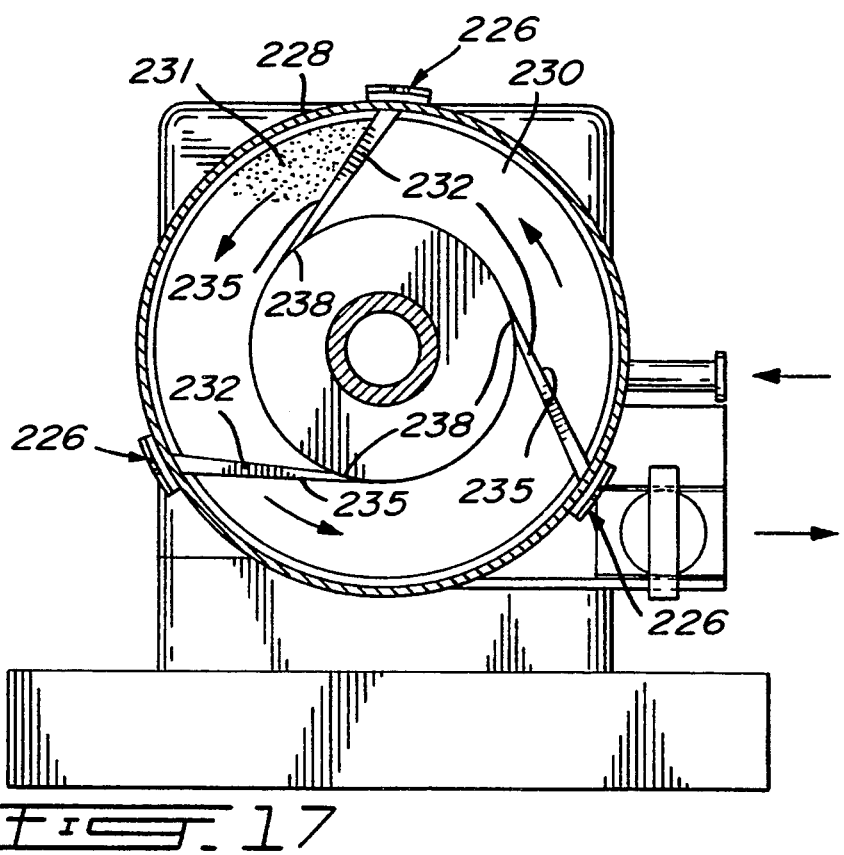

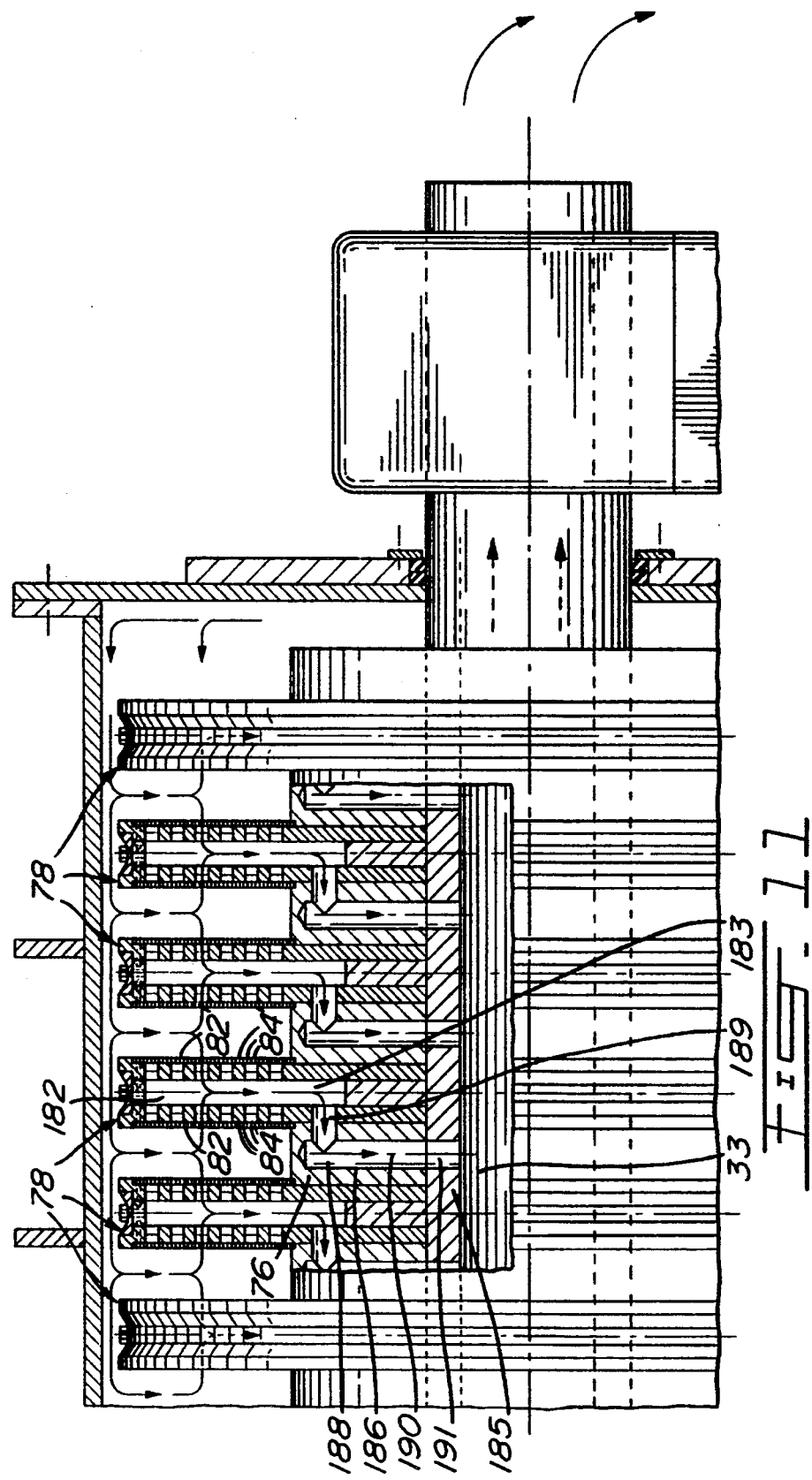

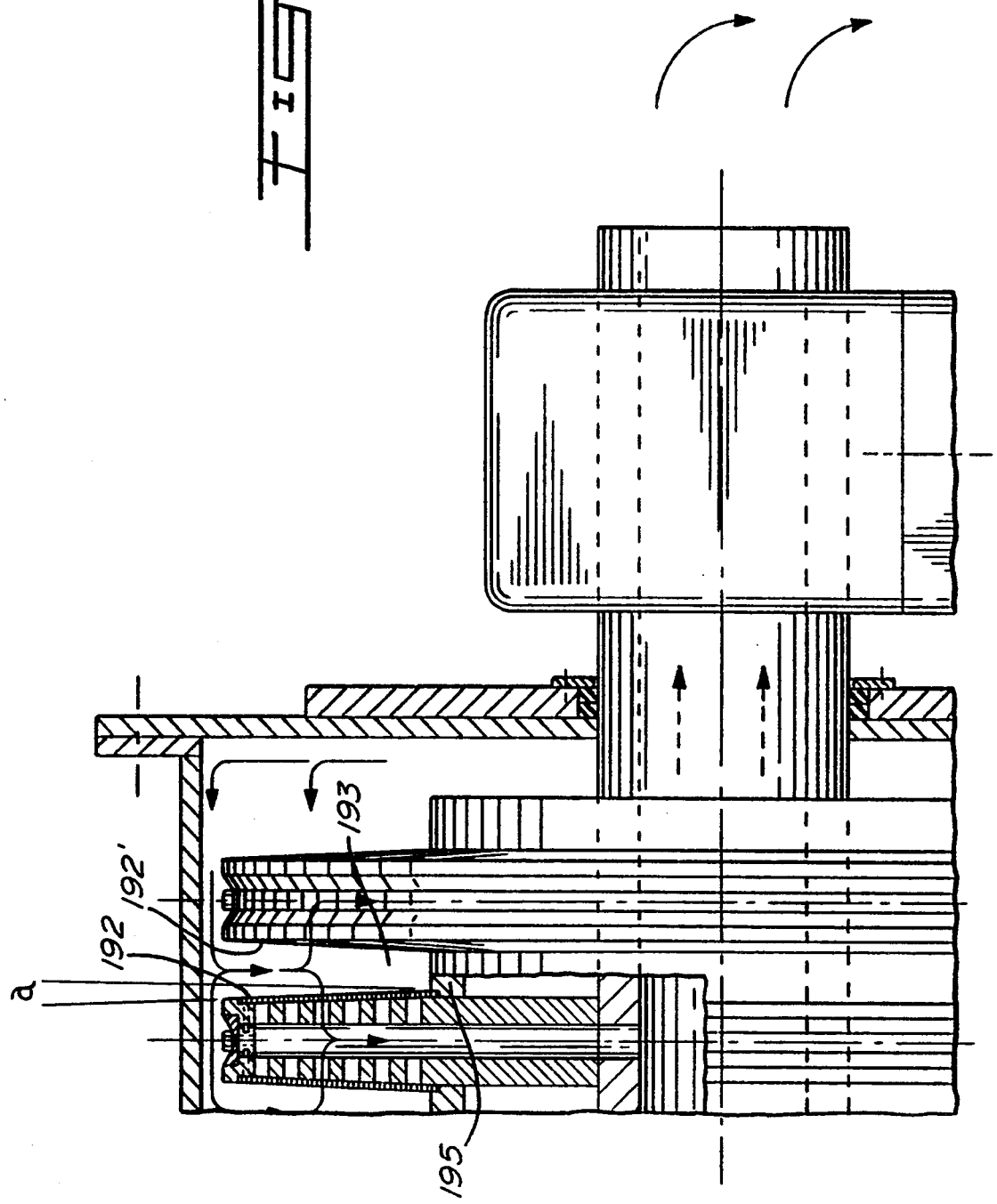

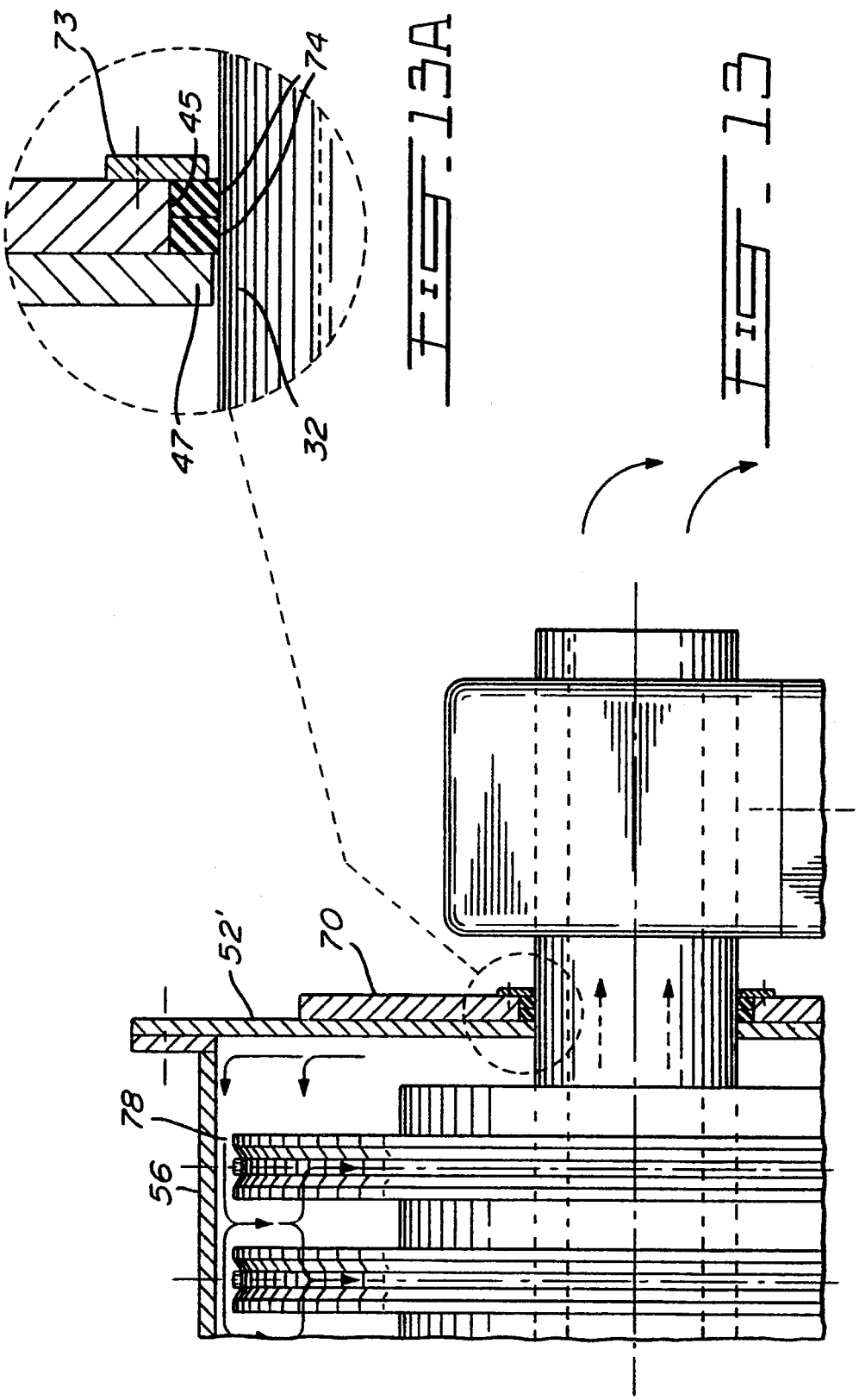

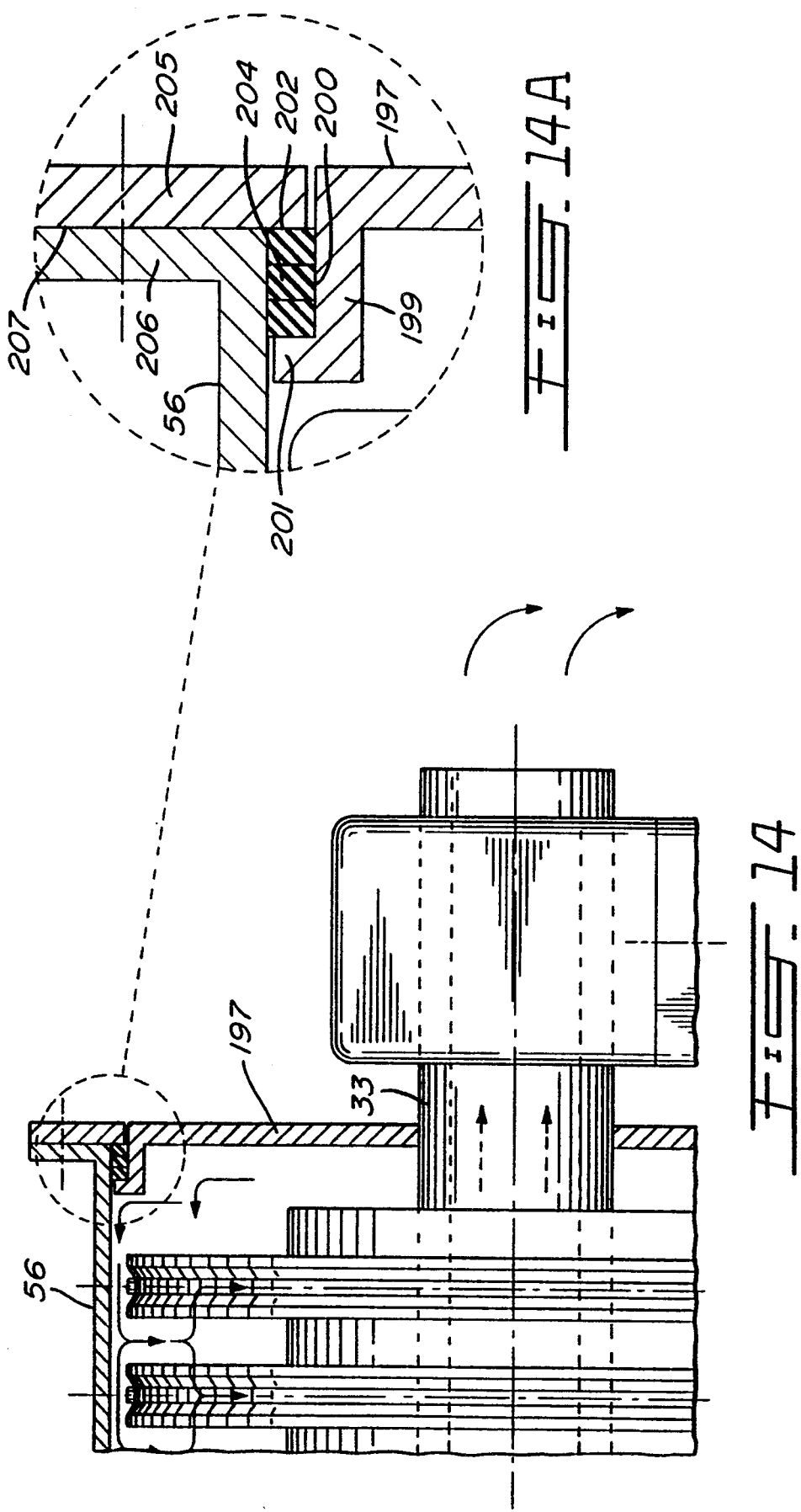

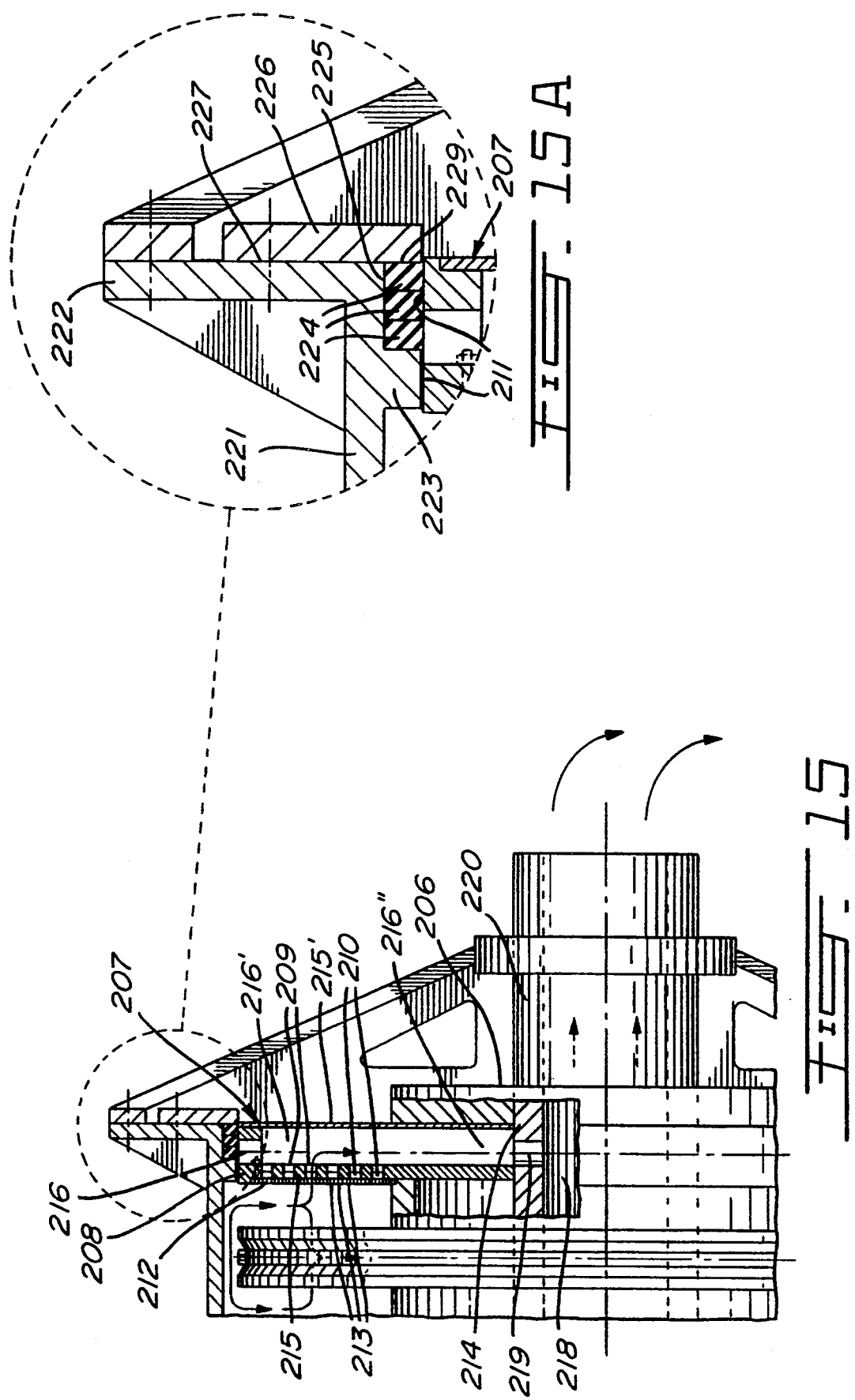

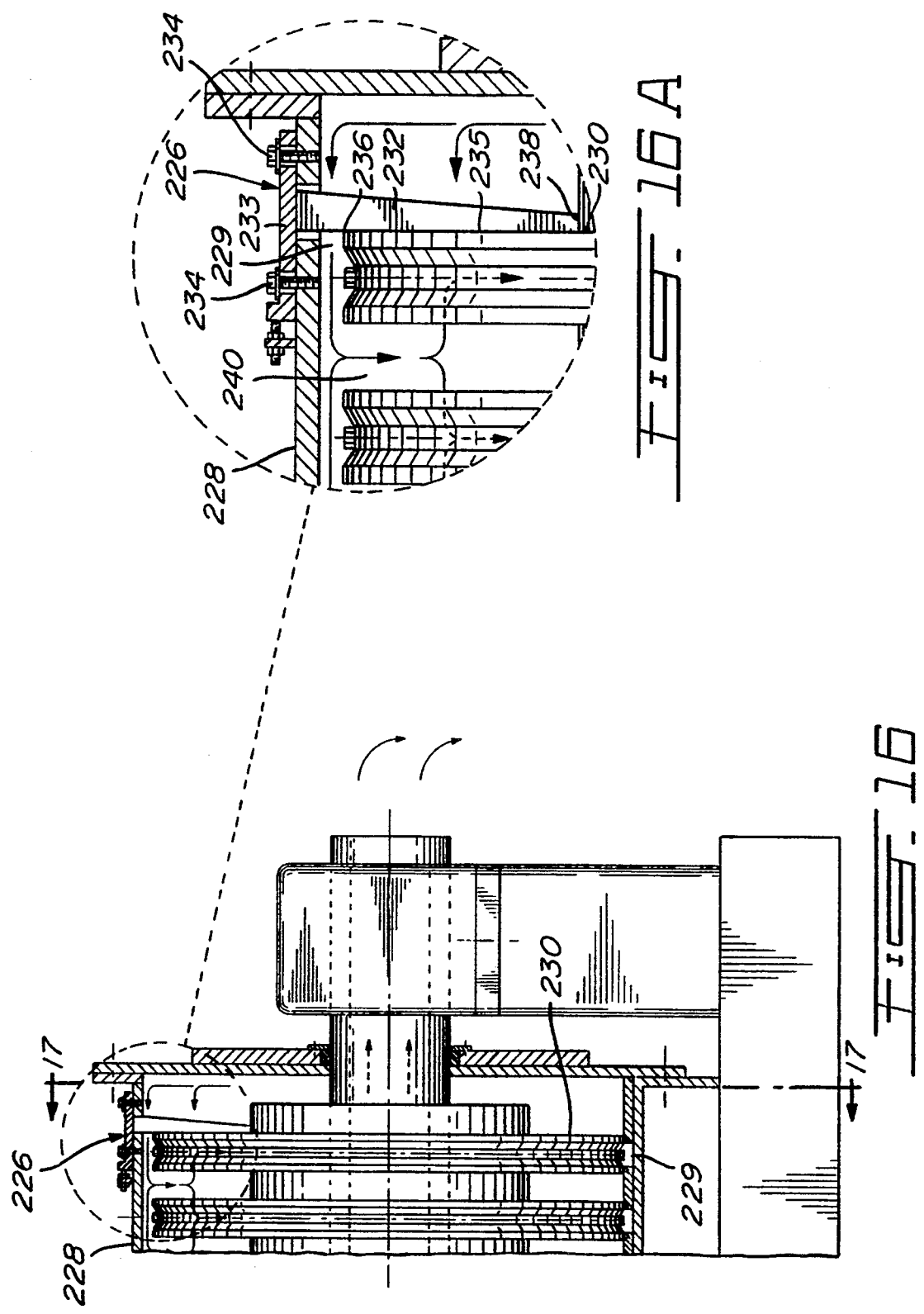

APPARATUS AND METHOD FOR EXTRACTING LIQUID FROM A HUMID MASS

The present invention relates to an apparatus and method for extracting liquid from humid mass such as slurries, sludges or other wet matters, as those used or produced in pulp and paper industry, waste water treatment plants, agricultural, food and beverages industries, etc.

The apparatus and method according to the present invention operate on the same basic extraction principle as the system and method described in U.S. Pat. No. 4,534,868 the disclosure of which is incorporated by reference. One of the examples illustrated in this prior patent uses a wheel comprising a rectangular channel whose sides are respectively defined by the peripheral wheel surface, a pair of side walls provided with perforations, and a fixed peripheral wall mounted on the apparatus frame, whereby space delimitated by this channel is essentially closed along the entire length of the channel. In practice, since the proper rotation of such wheel requires having a small clearance between wheel side walls and peripheral wall, in order to prevent leaks of matter at the junction, it is necessary, especially for relatively low consistency humid mass or such mass containing small particles or short fiber materials, to mount seals adjacent the peripheral wall in the areas which are in contact with edges of the side walls. Since such seals are exposed to friction forces, they may require adjustments and replacement, in order to minimize leaks causing loss of matter. Moreover, relatively high friction exerted along the entire length of the peripheral wall and its juction with the side wall edges requires stronger structural and driving components for such apparatus, leading to increased manufacturing and operating costs.

It is therefore a feature of the present invention to provide an apparatus and a method for extracting liquid from a humid mass and which eliminates the need for using seals along the entire length of the extracting channel. Another feature of the present invention is to provide an apparatus for extracting liquid from a humid mass having a wide field of liquid extraction applications, especially for humid mass having relatively low consistency or containing small particles or short fiber materials.

Another feature of the present invention is to provide an apparatus for extracting liquid from a humid mass which minimize loss of matter during operation.

Another feature of the present invention is to provide an apparatus for extracting liquid from a humid mass which is less expensive to manufacture and operate as compared to prior art devices.

According to the above features, from a broad aspect, the present invention provides an apparatus for extracting liquid from a humid mass. The apparatus comprises a cylindrical housing having a first and a second end wall and a cylindrical side wall. At least one inlet is provided for admitting said humid mass in the housing. Means is also provided for forcing said humid mass into the inlet. Rotor means, having at least one pair of rotor side walls, which are joined to a bottom wall and define a channel open at its periphery in at least a portion thereof. At least one of the rotor side walls is provided with perforations. The rotor means has a central shaft for rotation with respect to the housing, this shaft having a conduit extending longitudinally therethrough, and is provided with at least one draining means comprising at least one draining conduit having a first portion in fluid communication with the perforations. At least one of rotor side walls is moved upon rotation of the central shaft. The draining conduit has a second portion in fluid communication with the shaft conduit. A drive means is connected to the shaft for rotating the rotor means and the apparatus is provided with at least one outlet for discharging matter containing a reduced percentage of liquid therein upon rotation of the rotor means, the channel being in direct communication with the shaft conduit.

According to a further broad aspect of the invention, there is provided a method for extracting liquid from a humid mass. Such method uses a cylindrical housing having a first and a second end wall, a cylindrical side wall and at least one inlet for admitting the humid mass in the housing. The method further uses a rotor means having at least one pair of rotor side walls joined to a bottom wall defining a channel open at its periphery in at least a portion thereof, at least one of the rotor side walls is provided with perforations. The rotor has a central shaft for rotation with respect to the housing, with the shaft having a conduit extending longitudinally therethrough. At least one of rotor side wall is moved upon rotation of the central shaft. The rotor means is further provided with at least one draining means comprising a first portion in fluid communication with perforations. The draining means has a second portion in fluid communication with the shaft conduit. The apparatus used is provided with at least one discharging outlet. The method comprises the steps of: (a) admitting the humid mass into the housing through the inlet; (b) rotating the rotor means about the axis of the shaft causing extraction of liquid from humid mass into the channel through perforations in at least one of the pairs of rotor side walls; (c) draining extracted liquid toward the shaft conduit for withdrawing liquid and; (d) discharging humid mass containing a reduced percentage of liquid therein through a discharging outlet.

A preferred embodiment of the present invention will now be described with reference to the accompanying drawings in which:

FIG. 1 is a partially cut away front view of an example of the apparatus according to the present invention showing one extracting unit having front humid mass inlets;

FIG. 1A is a detailed partial cross-sectional view of the junction of the peripheral wall and the draining disc peripheral edge, as shown in FIG. 1;

FIG. 2 is a lateral cross-sectional view along sections lines 2—2 of FIG. 1 with the perforated side wall partially cut away;

FIG. 11 is a partial cross-sectional front view of the apparatus as shown in FIG. 1 showing another example of the rotor according to the present invention;

FIG. 12 is a partial cross-sectional front view of the apparatus as shown in FIG. 1 showing another example of the rotor according to the present invention;

FIG. 13 is a partial cross-sectional front view of an example of end seals provided on an apparatus as shown in FIG. 1;

FIG. 13A is a detailed partial cross-sectional view of the end seals as shown in FIG. 13;

FIG. 14 is a partial cross-sectional front view of another example of end seals provided on an apparatus according to the present invention.

FIG. 14A is a detailed partial cross-sectional view of end seals as shown in FIG. 14;

FIG. 15 is a partial cross-sectional front view of another example of end seals provided on an apparatus according to the present invention;

FIG. 15A is a detailed partial cross-sectional view of the end seals as shown in FIG. 15;

FIG. 16 is a front partial cross-sectional view of the apparatus according to the present invention showing a scraping means for removing high consistency humid matter accumulating on outer rotor side walls;

FIG. 16A is a front detailed partial cross-sectional view of the scraping means as shown in FIG. 16; and FIG. 17 is a lateral cross-sectional view along section lines 17—17 of FIG. 16.

Figure 3:
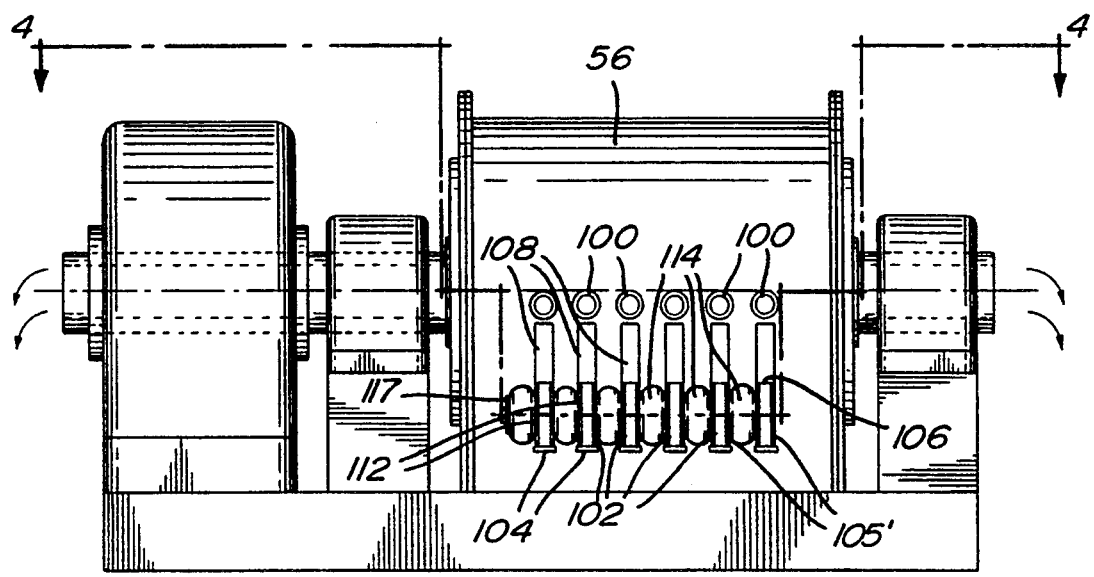
FIG. 3 is a front view of the apparatus as shown in FIG. 1.

Referring now to the drawings and more specifically to FIG. 1 and FIG. 2, there is shown a first example of the present invention wherein there is illustrated generally at 20 an apparatus for extracting a liquid from a humid mass. The apparatus comprises a base 22 supporting an extracting unit 24, a drive unit 26 and two bearing members 28 and 30 secured on the base 22 respectively on each side of extracting unit 24. The extracting unit 24 comprises a rotor generally designated at 31 having a shaft 32 extending throughout the apparatus trough drive unit bore 34, first bearing member bore 36, extracting unit bores 38 and 40, and second bearing member bore 42. Shaft 32, which is seated on bearings (not shown) mounted adjacent inner surfaces of bores 34, 36 and 42, is free to rotate about its longitudinal axis 44 with respect to bearing member 28 and 30 upon operation of the drive unit 26, which also comprises bearings (not shown) covered by end sleeves 35 and 35. Shaft 32 is provided with a conduit 33 extending longitudinally therethrough, whereby extracted liquid can be discharged out of the apparatus along conduit 33 at either discharging ends 37 and 37' of the shaft 32, as indicated by arrows 16 and 18, as will be later explained in more details. Obviously, providing only one discharging end would be appropriate, and either discharging end can be connected to a pipe or other equivalent device for transporting extracted liquid for storage or further processing.

The extracting unit 24 consists of a cylindrical housing generally designated at 50, and comprising a first and second end wall 52 and 52' sealingly coupled to a central cylindrical side wall 56 by flanges 58 and 60. Housing 50 is divided into a concentration portion 59 and a compression portion 61, as shown in FIG. 2, which will be later described in more details. The lower sections 62 and 64 of side walls 52 and 52' and support members 66 hold the extraction unit 24 on the base 22.

As shown in FIGS. 1, 13 and 13A, secured on both external surfaces of housing end walls 52 and 52' are provided end covers 68 and 70, having inner edges 45, on which are respectively mounted between end walls central portion 47 and holders 73 an annular seal assembly 74 contacting the shaft 32 along its entire circumference. Such seal assembly 74 prevents humid matter from leaking at the junction of the end walls and the cylindrical side wall. The rotor 31 comprises at least one draining disc 78 juxtaposed with annular spacers 76, forming bottom wall 77, the diameter and width of those annular spacers being predetermined depending on characteristics of humid mass to be processed. Obviously, such spacers can be omitted by mounting draining discs on shaft 32 directly by welding or using other equivalent well known mechanical joining technique.

Figure 10:
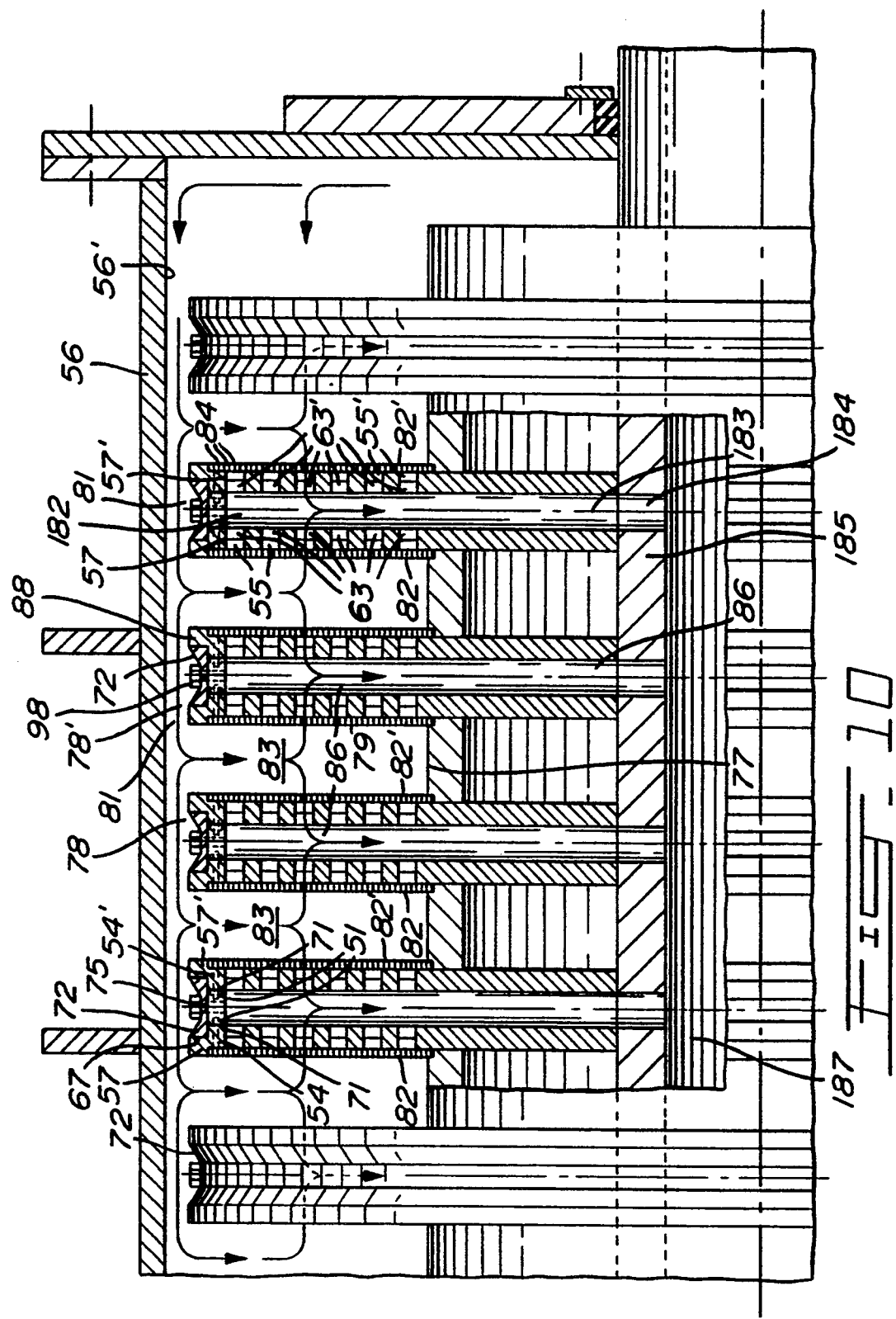
FIG. 10 is a partial cross-sectional front view of the apparatus as shown in FIG. 1 showing an example of a rotor according to the present invention.

As shown in FIG. 10, on both sides of each draining disc 78 are sealingly mounted rotor side walls 82 and 82'. Rotor side wall 82' and opposed rotor side wall 79 of the adjacent draining disc 78' define with bottom wall 77 a channel 83. Rotor side walls 82' and 79 are provided with perforations 84 on the greater portion of their surface. Draining disc 78 can be made of metal or hard plastic material depending upon characteristics of matter to be processed, and desired output consistency. Draining disc 78 comprises at least one draining conduit 86 radially bored from its periphery through its central portion. Preferably, a plurality of such draining conduits 86 are provided which are equally distributed over the entire circumference of draining disc 78, as better shown in FIG. 2. For blocking outer end 75 of draining conduit 86, a thin blocking ring 72 is sealingly mounted over the draining conduit outer end 75 in a recess 67 provided on the draining disc peripheral edge 88 and is secured thereto by a bolt and nut assembly 71. Threaded rods 54 and 54' are welded respectively on inner sides of the rotor side walls 82 and 82' which are secured to draining disc sides 57 and 57' by nuts 51. Series of transversal bores 63 and 63' are respectively provided through draining disc side 57 and 57' and are aligned with each draining conduit 86, so that the first portion 182 of the draining conduit 86 is in fluid communication with perforations 84 in the rotor side walls 82 and 82''. As better shown in FIG. 2, in order to collect extracted liquid from a substantial portion of the rotor side walls 82 and 82', a series of circular grooves 55 and 55' extend respectively at the surface of the draining disc sides 57 and 57', which grooves are in direct fluid communication with respective series of transversal bores 63 and 63'. The second portion 183 of the draining disc 78 is connected to the shaft conduit 187 with connecting bores 184 passing through the shaft peripheral wall 185, thereby extracted liquid can flow into the shaft conduit.

It is within the scope of the present invention to replace draining discs, as described above, with other equivalent draining means supporting perforated side walls 82 and 82' which could perform liquid extraction essentially in the same way. For example, draining disc 57 and 57' can be respectively replaced with two facing series of equally spaced bracing members (not shown)

extending from the bottom wall 77 to blocking ring 72, the extremities of such bracing members being respectively secured along the circumference of the bottom wall 77 and the blocking ring 72. The trapezoidal conduits defined between such bracing members would be in fluid communication with shaft conduit, whereby to perform liquid draining essentially in the same way as the draining conduit 86 as shown in FIG. 10. In such alternative embodiment, a perforated support frame should be provided for mounting perforated side wall over such bracing members.

Referring to FIG. 10, channel 83 is open in its peripheral portion and communicates with a gap 81 delimited by the outer surface of blocking ring 72, draining disc peripheral edge 88 and the inner surface 56' of housing cylindrical side wall 56 of the housing. Referring now to FIGS. 1 and 2, outer side discs 87 and 87' of end draining discs 89 and 89' face respectively first and second housing end walls 52 and 52' delimitating therebetween, as a part of concentrating housing portion 59, end cavities 53 and 53' whereby consistency of incoming humid mass circulating therein is raised prior to entering a channel. A peripheral wall 90 adjacent compression housing portion 61 is mounted on the internal surface of the lower portion of the cylindrical housing side wall, and an extension 104 of this peripheral wall defines a channel 83 extending tangentially to at least one outlet 102. Portion 109 of peripheral wall 90, as shown in dotted line, which faces draining disc peripheral edge 88 extends circularly toward open peripheral portion of channel 83, with its extremity edge 109' ending under inlet 100.

Compression of humid mass produces a cake 85 which is discharged out of channel 83 through outlet 102, as will later be explained in more details. The legth of the peripheral 90 wall can be predetermined depending on the characteristics of humid mass and the desired output consistency thereof. Referring to FIG. 1A, there is shown an end portion of draining disc 78 at the junction of the draining disc peripheral edge 88 and peripheral wall 90. Since proper rotation of rotor 31 requires a small clearance between the draining disc peripheral edge and the peripheral wall, a seal may be required at this junction to prevent the humid mass circulating inside the channel 83 from leaking through the junction. FIG. 1A shows an example of such seal which comprises first and second grooves 92 and 94 extending along peripheral wall 90.

These first and second grooves face portions of the peripheral wall external surface, respectively, near first and second opposed edges thereof, whereby upon rotation of rotor 31, the grooves accumulate high consistency compacted humid matter thus preventing humid mass circulating inside channel 83 from leaking through the junction between the draining disc peripheral edge 88 and the peripheral wall 90, while preventing incoming matter to flow in channel 83 though this junction. Although a seal is provided at this junction, clearance variations along the junction may cause a certain amount of humid matter to leak either at the junction, bringing about accumulation of compacted humid matter, which could jam rotor 31 during rotation thereof. Furthermore, incoming matter sedimentation can occur under gravity at the junction toward the bottom of the housing.

To prevent such problem, a recess 96 is provided in the peripheral wall facing the blocking ring 72 external surface and which extends along the entire length of the peripheral wall 90. Head 98 of the bolt and nut assembly 71, mounted on peripheral edge 88, acts as a tearing head preventing compacted matter accumulation or incoming matter sedimentation. Upon rotation of rotor 31, tearing head 98 tears out accumulated humid matter from the recess 92, which otherwise could jam the rotor 31. Furthermore, teared out humid matter can return toward concentrating housing portion 59 and recirculate into the channels, whereby such humid matter is recycled. A plurality of such tearing heads can be distributed over the entire circumference of blocking ring 72.

Figure 4:
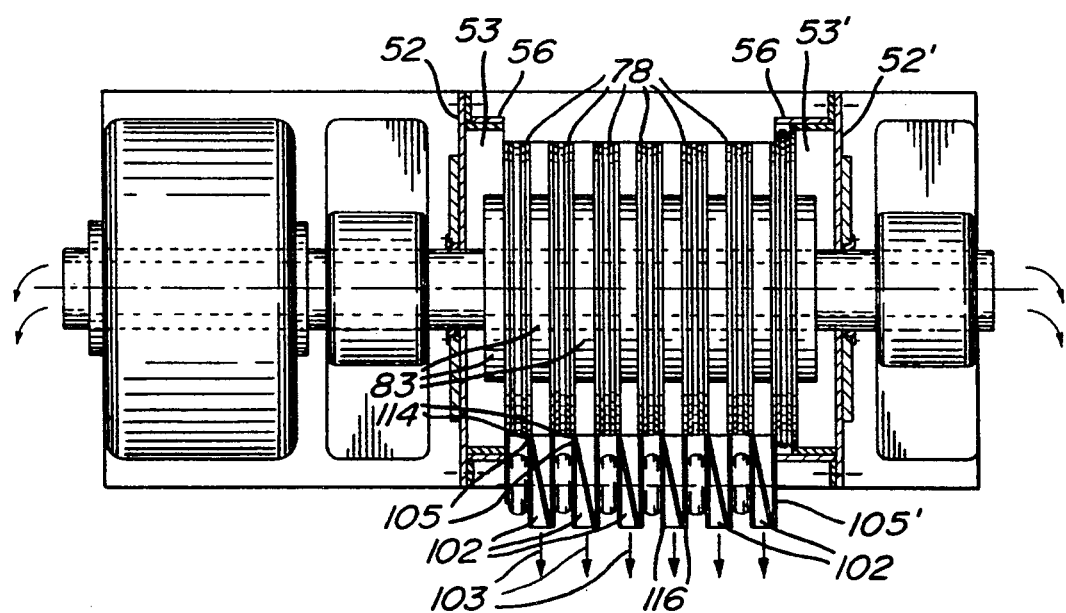
FIG. 4 is a cross-sectional plan view along section lines 4—4 of FIG. 3.

Referring now to FIGS. 2, 3 and 4, there is connected through cylindrical side wall 56 at least one inlet 100 for admitting humid mass in housing 50, as indicated by arrow 101.

Although though only one of such inlet would generally be required, as herein shown, an inlet is provided adjacent each channel 83 whereby flow of humid mass entering the housing through inlets 100 helps prevent humid mass accumulation in concentrating housing portion 59, particularly for humid mass having high initial consistency. Although humid mass can be admitted in the inlet by gravity from an elevated tank, it is preferably admitted through the utilization of a pump (not shown) connected either upstream for directly feeding humid mass therein or downstream (see FIG. 10) for sucking extracted liquid through portion 183 of the draining discs and the shaft conduit 187, thereby causing humid mass to be admitted in the inlet 100. Alternatively, feeding screws, which are well known in the art, could replace the pump as a means for admitting humid mass into the inlet 100, especially for medium or high initial consistency humid mass containing typically over about 12% in weight of solid matter. As shown in FIGS. 2, 3 and 4, for discharging processed humid mass out of apparatus as indicated by arrows 103, each channel of the apparatus has an associated adjacent outlet 102. Each outlet 102 is defined in its lower portion by the peripheral wall extension 104, and in its upper portion by the lower side wall 106 of a scraper 108 passing through cylindrical side wall 56. Each oulet 102 is further defined by lateral wall 105 adjacent restricting gate 112, and lateral wall 105' facing lateral wall 105 and restricting gate 122, which lateral wall 105' stands apart from lateral wall 105 by a distance corresponding to the width of the channel 83.

Scraper 108 is provided at the inner end of its lower side wall 106 with a scraping edge being in contact at 110 with the external surface of bottom the wall 77, such scraping edge acting as a doctor blade whereby high consistency humid matter can be removed from external spacers surface and directed to outlet 102 along and between the scraper lower side wall 106, peripheral wall extension 104 and lateral walls 105 and 105'. Restricting gate 112 has a first vertical edge 114 mounted with a hinge (not shown) to the outer vertical edge of lateral walls 105, and a second vertical edge 116 whereby the opening of outlet 102 can be controlled from a completely open position, when gate 112 is substantially parallel to lateral walls 105 and 105', to a completely closed position, when second gate edge 116 becomes adjacent to the lateral wall 105' upon complete rotation of gate 112 toward the lateral wall 105, as shown by dotted lines 116'.

Adjacent each restricting gate 112, an inflatable rubber cushion 114 or other equivalent actuator device is mounted on a holder 117 secured to peripheral wall extension 104. Depending on air pressure applied to cushion 114 supplied by an air pressure generating and regulating means (not shown), the position of the gate 112 and the pressure on the gate are externally controlled by a pneumatic control device (not shown), and of a type well known in the art. The functioning of restricting gate for liquid extraction will be explained later in more details. Obviously, instead of providing vertical restricting gates, horizontal restricting gates could be provided. As it is the case with end cavities 53 and 53' which are not adjacent to any outlet as shown in FIGS. 3 and 4, some of the channels 83 can be arranged in a similar manner whereby incoming humid mass circulating in such channels, as a part of concentrating housing portion 59, is raised prior to entering a channel adjacent to an outlet.

Figure 5:
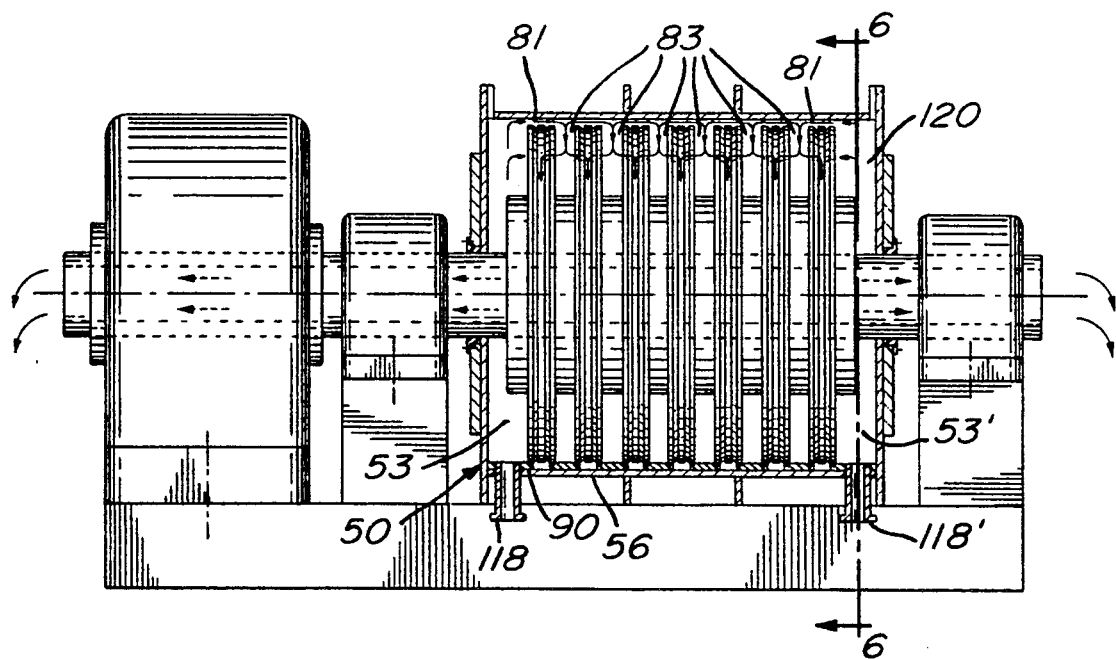
FIG. 5 is a partial cross-sectional front view of an example of the apparatus according to the present invention showing one extracting unit having humid mass inlets located under the housings.
Figure 6:
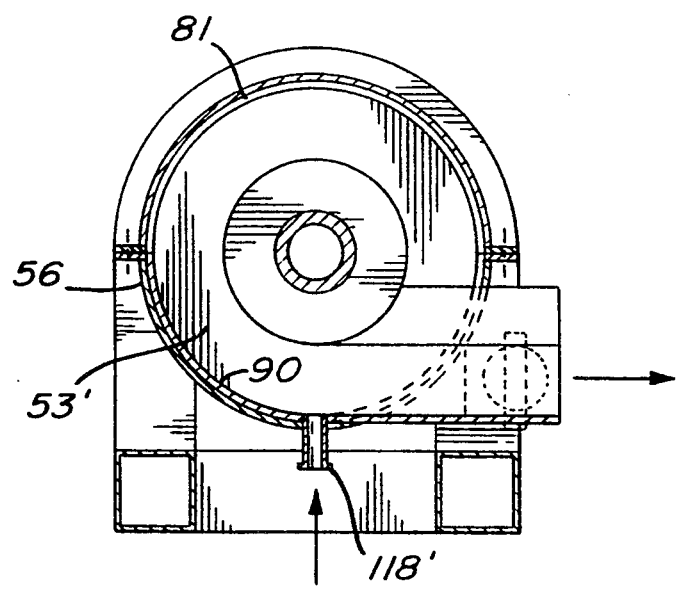
FIG. 6 is a lateral cross-sectional view along sections lines 6—6 of FIG. 5.
Figure 7:
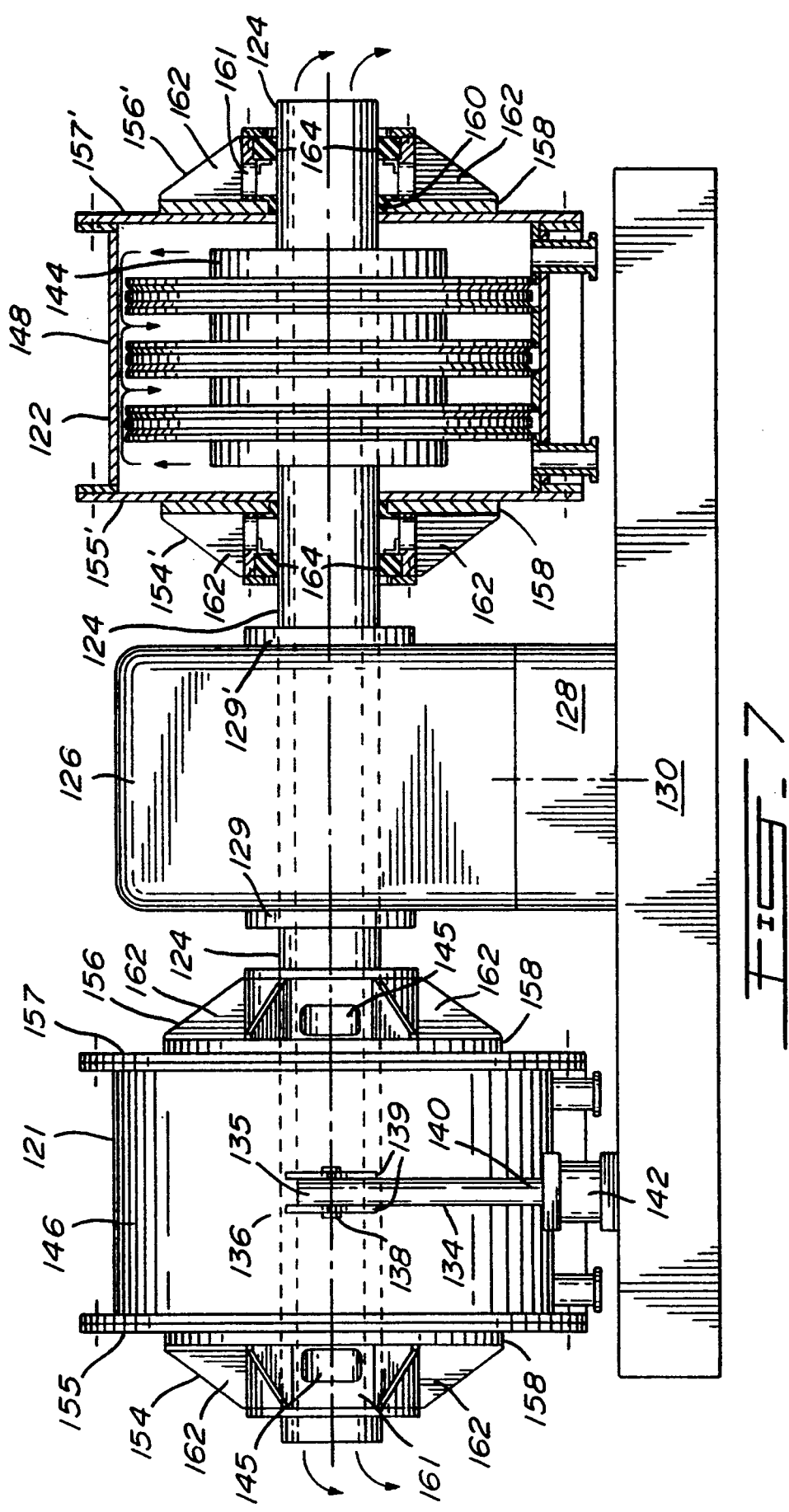
FIG. 7 is a partial cross-sectional front view of another example of the apparatus according to the present invention showing two front inlets extracting units suspended and connected through a common shaft to a central driving unit.
Figure 8:
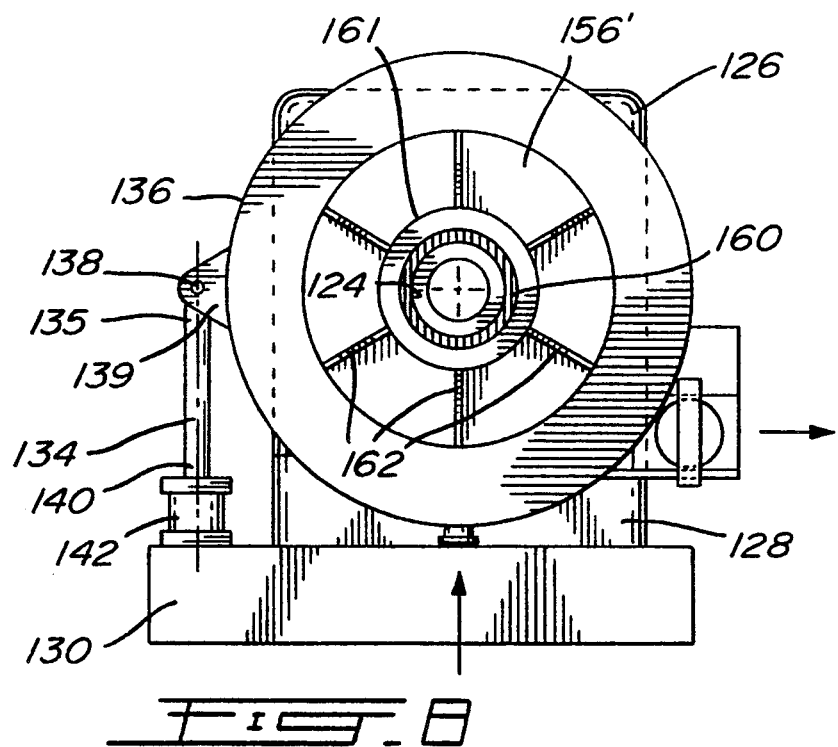
FIG. 8 is a lateral view of the apparatus as shown in FIG. 7.

Referring now to FIGS. 5 and 6, there is illustrated an example of the apparatus according to the present invention which is essentially identical with the one shown in FIGS. 1 to 4 but comprising two bottom humid mass inlets 118 and 118' provided underneath the housing instead of front inlets, as those found in prior example of the apparatus. Inlets 118 and 118' pass through cylindrical side wall 56 and peripheral wall 90 at both end portions of the housing 50 thus communicating respectively with end cavities 53 and 53' at the lower portion of housing 50. Especially for humid mass having relatively low and medium initial consistency, humid mass flows incoming from such bottom inlets and travelling along end cavities 53 and 53' toward channels 83 through gap 81, as shown by arrows 120, help to prevent humid matter from accumulation in end cavities. Obviously, although two inlets at both ends of the apparatus are preferred in order to obtain better humid mass circulation, providing only one of such bottom inlets at either ends of the apparatus would be appropriate. Referring to FIGS. 7 and 8, there is shown another example of the apparatus according to the present invention illustrating two extracting units 121 and 122 provided with bottom humid mass inlets, both of which units being suspended and connected through a common shaft 124 to a central driving and bearing unit 126 mounted on a support member 128 secured to a base 130. Such configuration of apparatus has the advantage of providing more than one extracting unit coupled to a unique drive unit, and requiring minimum rotor, stator and bearings aligning adjustments. Driving and bearing unit 126 comprises drive and rotor bearings (not shown) which are covered with end sleeves 129 and 129'. Rotation of extracting unit rotor 144 produces a torque which is communicated to both extracting units housings 146 and 148. In order to prevent rotation of housings 146 and 148, each of those is provided with a torque arm 134 having an upper end 135 which is rotationally secured to the external surface of cylindrical side wall 136 through a pivot 138 and holder assembly 139. The assembly has a lower end 140 coupled to an optional torque sensor or torque limiter secured on base 130, which sensor or limiter can be omitted by directly securing lower arm end 140 on base 130. When a torque sensor is used, a torque measuring system (not shown) can be provided to monitor maximum torque applied to the apparatus. On end walls 155, 157 and 155', 157' of extracting units 121 and 122 are mounted end covers 154, 156 and 154', 156', respectively. Referring to the cross-sectional view of the cover 156' of extracting unit 122, it can be seen that the cover is comprised of a base annular plate 158 having inner edges on which are mounted an annular seal assembly 160 which is in contact with the shaft 124 along its entire circumference. Mounted on annular plates 158 with braces 162 are sleeves 161 in which are mounted stator bearings 164 in contact with shaft 124 along its entire circumference, which bearings support the unit 122 on the shaft 124. Each one of sleeves 161 is provided with at least one hole 145 giving access to seal assemblies 160 and 164. Regarding all other aspects, the apparatus shown in FIGS. 7 and 8 is identical with those explained herein above with reference to FIGS. 1 to 5, and although the apparatus shown in FIGS. 7 and 8 is provided with bottom inlets, it could also be provided with at least one front inlet as those shown in the apparatus illustrated in FIGS. 5 and 6.

Figure 9:
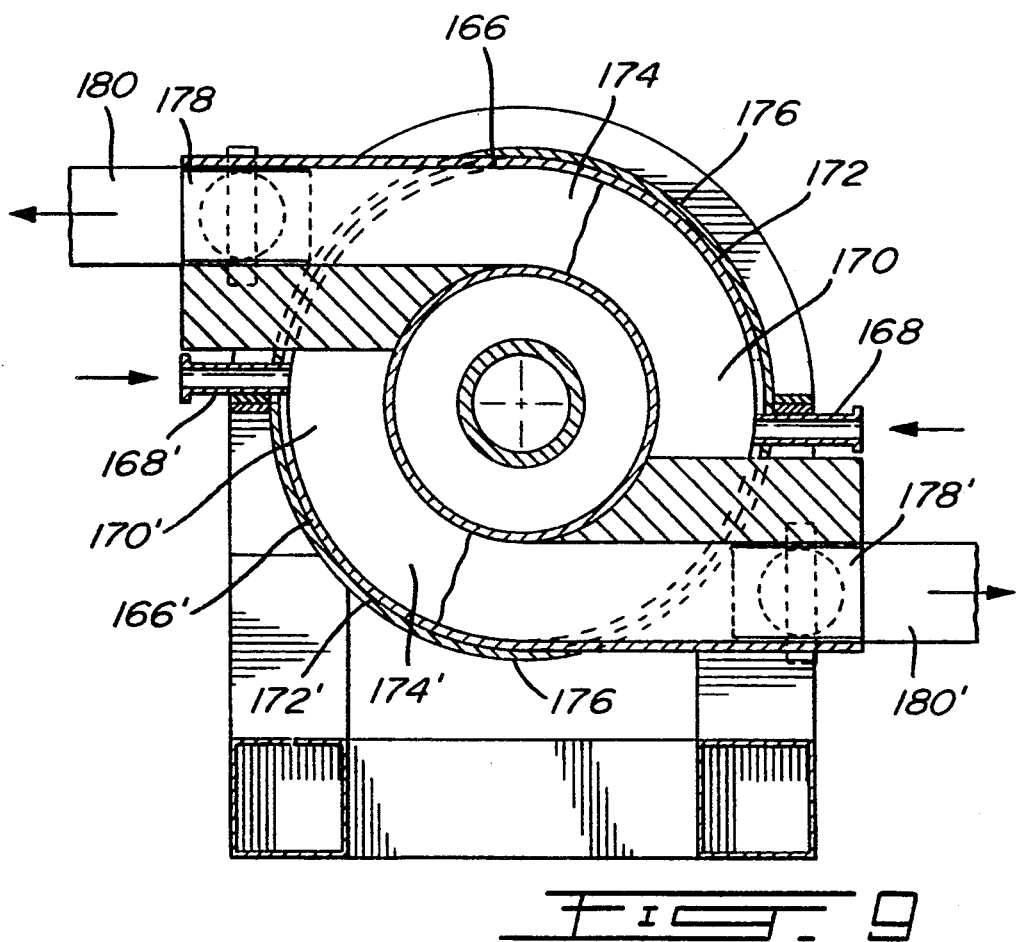
FIG. 9 is a lateral view of another example of the apparatus according to the present invention wherein each extracting channel comprises two inlets and two outlets.

Referring now to FIG. 9, there is illustrated another example of the apparatus according to the present invention and wherein each channel is in direct communication with more than one inlet and outlet, in order to enhance the extraction capacity for each channel. In the example shown in FIG. 9, there are two inlets and two outlets per channel. A first and second inlet 168 and 168' are provided for admitting humid mass respectively in the first concentration portion 170 and second concentration portion 170' of channel portion 166 and 166, respectively. Peripheral walls 172 and 172' which are, respectively, adjacent compression portions 174 and 174, are mounted on the internal surface of the cylindrical housing side wall 176. The peripheral walls respectively extend to outlets 178 and 178' where processed humid mass cakes 180 and 180', or humid mass containing reduced liquid contents, are discharged. Regarding all other aspects, the apparatus shown in FIG. 9 is identical with those explained herein above with reference to FIGS. 1 to 5. Referring now to FIG. 11, there is illustrated a further example of the rotor 31 showing at least one draining disc 78 having a first portion 182 being in fluid communication with perforations 84 and 84' in rotor side walls 82 and 82'. Second portion 183 of draining disc 78 is connected to a first portion 188 of conduit 186 extending radially through the annular spacer 76 by a connecting bore 189. Second portion 190 of conduit 186 communicates with shaft conduit 33 through a bore 191 passing through the shaft peripheral wall 185, whereby extracted liquid can flow into the shaft conduit.

Referring to FIG. 12, another example of the rotor according to the present invention is shown, and consists of a different draining disc and channel configuration where at least one of rotor side wall 192 and 192' is inclined inwardly, whereby the transversal section area of channel 193 increases from the channel bottom wall 195 toward the peripheral ends of the side wall 192 and 192'. Since longitudinal section of the channel which is initially circular becomes linear in the contact area 110 of the scraping edge, as shown in FIG. 2, the increasing channel transversal section provides additional space to clear removed matter for discharging through outlet 102. This configuration is especially useful for utilization of the apparatus as a concentrator or thickener for humid mass having relatively low initial density, to minimize compaction occurring at the scraper. Furthermore, this configuration is also useful for large diameter draining discs having deep channels or for the production of a high consistency end matter, as it facilitates removal of matter from the scraper edge area toward each outlet 102. Depending on humid mass characteristics, side wall inclination angle a, which is defined with reference to the vertical plane, can be predetermined from about 1 degree to about 10 degrees.

Referring now to FIGS. 14 and 14A, there is illustrated a further example of the end seal assembly provided on the apparatus according to the present invention. In this arrangement, at least one of the housing annular end walls 197 is sealingly secured along the circumference of shaft 33 and is provided at its peripheral extremity with a first flange 199 extending inwardly and parallel to the cylindrical side wall 56. Cylindrical side wall 56 is provided at its peripheral extremity with a second flange 206 extending outwardly and parallel to the annular end wall 197. Annular seal assembly 204 is mounted on the inner side of the cylindrical wall peripheral extremity and is in contact with the outer surface 200 of flange 199. An annular holder 205 is mounted on outer surface 207 of flange 206 to keep the seal assembly 204 in position between the flange edge 201 and the holder edge 202. Upon rotation of the shaft 33, annular end wall 197 rotates with its peripheral extremities slipping on the adjacent surface of the seal assembly 204, preventing the humid matter from leaking at the junction of the end wall and the cylindrical side wall 56.

Although FIGS. 14 and 14A illustrate a seal assembly mounted on an apparatus having its extracting unit directly supported on a base as shown in FIG. 1, such seal assembly can also be provided on an apparatus having shaft suspended extracting units as shown in FIG. 7, providing end covers and stator bearings as those shown in FIG. 15 which will be hereunder described. Referring to FIGS. 15 and 15A, there is illustrated another example of end seal assembly that could be provided on the apparatus according to the present invention. In this arrangement, rotor 206 has at least one additional draining disc 207 comprising a peripheral ring 208 having a peripheral surface 211, a first disc side 215 provided with bores 209 and grooves 210 and a second unperforated outer disc side 215', which outer side constitutes one of the end walls of the apparatus housing and being sealingly secured to the shaft 220 along its entire circumference. Perforated side wall 212 is mounted on the side disc 215 which has a draining conduit 216 radially bored from its periphery through its central portion. Preferably, a plurality of such draining conduits are provided and are equally distributed over the entire circumference of draining disc 207. First portion 216' of the draining conduit 216 is in fluid communication with perforations 213 of the perforated side wall 212. The second portion 216' of the draining conduit 216 is connected to shaft conduit 218 with connecting bore 219 passing through the shaft peripheral wall 214, whereby extracted liquid can flow into the shaft conduit. Cylindrical side wall 221 has a perpendicularly extending flange 222 forming the extremity of the cylindrical wall 221. An annular recess 225 is defined between the annular rib 223, provided on the inner surface of cylindrical wall 221 closed to its extremity, and an annular holder 226. A seal assembly 224 is mounted in the recess 225 so as to be in contact with the surface 211 of the ring 208. The annular holder 226 mounted on outer surface 227 of flange 222 keep the seal assembly 224 in position between the flange rib 223 and the holder edge 229. Upon rotation of the shaft 220, rotor 206 and draining disc 207 rotates with its peripheral surface 211 in slipping conctact with an adjacent surface of the seal assembly 224, thereby preventing humid matter from leaking at the junction of the draining disc with cylindrical side wall. Although FIGS. 15 and 15A illustrate this seal assembly mounted on an apparatus having shaft suspended extracting units, as shown in FIG. 7, such seal assembly can also be provided on an apparatus having its extracting unit directly supported on a base and using rotor bearings, as the apparatus shown in FIG. 1.

Referring now to FIGS. 16, 16A and 17, there is illustrated the end portion of the apparatus according to the present invention showing the scraper assemblies 226 secured to the cylindrical housing side wall 228 near one of its extremity and adjacent the outer rotor side wall 230 of the outer draining disc 229. The side wall 230 is provided with perforations 231 on the greater portion of its surface. As shown in FIG. 16A, although only one scraper assembly could be provided, a plurality of scraper assemblies are preferably distributed along the circumference of the outer side wall 230 to obtain better results. Each scraper assembly has a scraper blade 232 attached to a mounting plate 233 which is sealingly secured to the cylindrical housing side wall 228 by bolts 234.

Each scraper blade 232 has a scraping edge 235 in contact with the perforated side wall 230 and extends along its surface from the side wall edge 236 to the bottom wall or the spacer surface 238. Although not essential to the proper operation of the apparatus, these scraper assemblies could be useful to remove higher consistency humid matter obtained through liquid extraction which accumulate on the outer side wall surface, thereby raising the consistency of the circulating humid mass before it enters the channel 240. Furthermore, clearing accumulated humid matter in the area of the side wall perforations 231 enhances extraction efficiency. Although not illustrated, for the same purpose, such scraper assemblies can be mounted adjacent all other rotor side walls in the concentration portion of all channels 240.

Summarizing the operation of the apparatus of the present invention with reference to FIGS. 1, 2, 3, 4 and 10, humid mass to be processed is admitted into front inlet 100 and fills the inner space of the housing surrounding the draining discs 78. In order to avoid discharging unprocessed humid mass, especially if the latter has a relatively low initial consistency, the initial supply of the humid mass to the apparatus is carr'ed out with restricting gate 112 in a closed position, whereby any matter cannot escape from outlet 102. Such initial supply is preferably done when the rotor 31 is stationary, and prior to the rotation thereof. During apparatus filling, liquid begins to be extracted from the humid mass by passing through the perforations 84 in the rotor side walls 82 and 82', through the grooves 55 and 55' and bores 63 and 63', flowing into the draining conduit first portion 182, then circulating toward the draining conduit second portion 183, then passing through the connecting bores 184 and finally flowing into the shaft conduit 187 for discharging out of apparatus. Following the filling of the housing, extraction and discharge of liquid can occur in a continuous manner. Rotation of rotor 31 impart a rotational movement on the rotor side walls 82 and 82' creating a substantially static friction force between the surfaces of the rotor side walls and the humid mass causing the latter to travel on a substantially circular path along the channel 83 towards the outlet 102. Humid mass initially passes through the open channel section corresponding to concentrating portion 59 of the housing, then through the closed channel section corresponding to the compression portion 61 which is delimited by the peripheral wall 90, and then reaches scraping edge of scraper 108, which forces the humid mass to be removed and directs it tangentially toward the outlet 102. Prior to be discharged, as indicated by arrow 103, the humid mass or cake 85 reaching the outlet 102, pushes restricting gate 112, which is initially in a closed or partially open position, thus compressing cushion 114 whereby an increasing force is applied on the humid mass or cake in an opposite direction to its movement. When the force applied on the cake by the restricting gate becomes higher than the initial static friction force applied between the surfaces of the rotor side walls and the humid mass, the latter is forced to slip on the rotor side walls 82 and 82', and the dynamic friction force which is created drives the humid mass or cake towards outlet 102 at a lower speed than the rotor speed. This causes the accumulation of the incoming matter at the upstream edge of the cake 85, leading to increase internal humid mass pressure and causing liquid extraction. Furthermore, such matter accumulation increases the length of the cake 85 in compression portion 61, and causes an increase of the dynamic friction area, leading to a higher friction force and consequently a higher extraction and output cake speed. Depending on the humid mass characteristics, consistency of the processed humid mass leaving the outlet 102, can be controlled by adjusting the restriction at the outlet 102 by means of adjusting and regulating the pressure of the cushion 114. Furthermore, although such restriction is generally required to obtain effective liquid extraction under the effect of dynamic friction, in applications where the apparatus is used as a thickener or concentrator for the matter having a high flowing factor, liquid extraction could be obtained in a continuous process without any restriction at the outlet, wherein only static friction force would be acting. For matter presenting lower flowing factor, an apparatus according to the present invention may be provided with relatively narrow channels and could also be used in a batch process, thus requiring channels to be periodically discharged.

We claim:

1. An apparatus for extracting liquid from a humid mass Comprising:

A cylindrical housing having a first and a second end wall and a cylindrical side wall;

at least one inlet for admitting said humid mass into said housing;

means for forcing said humid mass into said inlet;

rotor means having at least one pair of rotor side walls joined to a bottom wall defining an extracting channel open at its periphery in at least a portion thereof, at least one of said rotor side walls being provided with perforations, said rotor means having a central shaft for rotation with respect to said housing, at least one of said rotor side walls being moved upon rotation of said central shaft, said shaft having a conduit extending longitudinally therethrough, said rotor means being provided with at least one draining means comprising at least one draining conduit being closed at its first extremity and having a first portion in fluid communication with said shaft conduit at its second extremity;

drive means connected to said shaft for rotating said rotor means;

means providing an alternative to seal along the entire length of said extracting channel, including a peripheral wall mounted on an internal surface of said cylindrical wall for substantially closing said extracting channel at its periphery in at least a portion thereof, sealing means mounted on said peripheral wall, said sealing means being in contact with a peripheral portion of said draining means whereby preventing humid matter in said extraction channel from escaping therefrom at the junction of said peripheral wall and peripheral portion while preventing humid mass incoming in said housing from flowing into said extraction channel through said junction, and housing sealing means for preventing said humid mass from escaping said housing; and at least one outlet for discharging humid mass containing a reduced percentage of liquid therein upon rotation of said rotor means, said extracting channel being in direct communication with said outlet, said peripheral wall extending to said outlet.

2. An apparatus for extracting liquid from a humid mass as claimed in claim 1 wherein said outlet is provided with a restricting means for creating an axial pressure against said humid mass to be discharged whereby discharging of said humid mass containing a reduced percentage of liquid therein can be controlled by said restricting means.

3. An apparatus for extracting liquid from a humid mass as claimed in claim 2 wherein said restricting means comprises a hinged gate mounted on said outlet and actuator means for controlling the position of said gate and pressure of said gate on said mass being discharged.

4. An apparatus for extracting liquid from a humid mass as claimed in claim 3 wherein said actuator means is an inflatable cushion.

5. An apparatus for extracting liquid from a humid mass as claimed in claim 1 wherein said means for forcing said humid mass into said inlet is a pump connected upstream of said inlet.

6. An apparatus for extracting liquid from a humid mass as claimed in claim 1 wherein said means for forcing said humid mass into said inlet is a pump connected downstream said draining means, said pump sucking said extracted liquid through said shaft conduit.

7. An apparatus for extracting liquid from a humid mass as claimed in claim 1 wherein said means for forcing said humid mass into said inlet is at least one feeding screw.

8. An apparatus for extracting liquid from a humid mass as claimed in claim 1 comprising at least one rotor side wall scraper means secured to said housing adjacent at least one of said rotor side walls, said side wall scraper means having a scraping edge in contact with said rotor side wall whereby substantially high consistency humid matter obtained through liquid extraction accumulating on said outer rotor side wall can be removed by said side wall scraper means upon rotation of said rotor means.

9. An apparatus for extracting liquid from a humid mass as claimed in claim 1 wherein said draining means is a draining disc comprising two opposed side walls adjacent said peripheral portion, at least one of said opposed side walls being provided with a plurality of bores extending therethrough, said rotor side wall being provided with perforations and being mounted on said at least one draining disc side wall provided with a plurality of bores, said bores being in fluid communication with said perforations and said at least one draining conduit.

10. An apparatus for extracting liquid from a humid mass as claimed in claim 9 wherein said plurality of bores is at least one series of bores disposed in a circular path at the surface of said at least one draining disc side wall, and wherein said draining disc side wall comprises at least one circular groove extending at the surface thereof, said groove being in fluid communication with said at least one series of bores.

11. An apparatus for extracting liquid from a humid mass as claimed in claim 10 wherein said peripheral wall is provided with a recess facing a central portion of an outer surface of said draining disc peripheral portion, said recess extending along the entire length of said peripheral wall.

12. An apparatus for extracting liquid from a humid mass as claimed in claim 11 wherein said peripheral portion comprises a means for tearing humid matter accumulating in said recess.

13. An apparatus for extracting liquid from a humid mass as claimed in claim 10 wherein said sealing means comprises a first and a second groove extending along said peripheral wall, said first and second grooves facing a respective external surface of said peripheral wall near first and second opposed edges of said peripheral wall whereby upon rotation of said rotor said grooves accumulates a substantially high consistency compacted sealing humid matter.

14. An apparatus for extracting liquid from a humid mass as claimed in claim 9 wherein at least one of said draining disc side walls faces one of said housing end walls whereby delimiting a space therebetween in which incoming humid mass circulates, said space being in indirect communication with said outlet.

15. An apparatus for extracting liquid from a humid mass as claimed in claim 14 wherein said rotor means comprises an outer rotor side wall provided with perforations and mounted on said draining disc side wall facing one of said housing end walls, said draining disc side wall having a plurality of bores extending therethrough, said bores being in fluid communication with said perforations, said perforations being in fluid communication with a first portion of said draining means, whereby consistency of incoming humid mass into said space is raised upon draining of said liquid.

16. An apparatus for extracting liquid from a humid mass as claimed in claim 15 comprising at least one rotor side wall scraper means secured to said housing, said side wall scraper means having a scraping edge in contact with said outer rotor side wall whereby accumulation on said outer rotor side wall of substantially high consistency humid matter obtained through liquid extraction can be removed by said side wall scraper means upon rotation of said rotor means.

17. An apparatus for extracting liquid from a humid mass as claimed in claim 1 wherein said rotor side walls extend substantially perpendicularly to the longitudinal axis of said shaft and are spaced apart in a substantially parallel relationship.

18. An apparatus for extracting liquid from a humid mass as claimed in claim 1 wherein at least one of said rotor side walls is inclined inwardly, said channel defining a transversal sectional area which increases along said rotor side wall towards an outer periphery of said channel.

19. An apparatus for extracting liquid from a humid mass as claimed in claim 18 wherein said rotor side wall is inclined inwardly at an angle of about 1 to 10 degrees.

20. An apparatus for extracting liquid from a humid mass as claimed in claim 1 comprising a scraper means adjacent said outlet, said scraper means having a scraping edge being in contact with said bottom wall.

21. An apparatus for extracting liquid from a humid mass as claimed in claim 1 wherein said bottom wall is the peripheral wall of an annular spacer surrounding said shaft.

22. An apparatus for extracting liquid from a humid mass as claimed in claim 21 wherein said second portion of said draining conduit comprises a secondary conduit extending in said annular spacer toward said shaft, said secondary conduit having a first end being in fluid connection with said first portion of said draining conduit, and a second end being in fluid communication with said shaft conduit.

23. An apparatus for extracting liquid from a humid mass as claimed in claim 1 wherein said first housing end wall is provided with a first bore, said second housing end wall being provided with a second bore, said shaft extending in said housing from said first bore through said second bore.

24. An apparatus for extracting liquid from a humid mass as claimed in claim 23 wherein said housing sealing means is a pair of seal assemblies respectively mounted on an inner surface of said first and second bores, said seal assemblies being in contact with said shaft, said shaft being in rotation with respect to said housing end walls.

25. An apparatus for extracting liquid from a humid mass as claimed in claim 23 wherein said housing sealing means is a pair of seal assemblies respectively mounted on an inner surface of said cylindrical side walls in proximity to a respective end thereof, said second seal assemblies being in contact with an outer edge of a respective end wall of said housing, inner surfaces of said bores in said end walls being sealing secured to said shaft.

26. An apparatus for extracting liquid from a humid mass as claimed in claim 23 wherein said rotor means has at least one additional draining means integral with one of said housing end walls, said additional draining means comprising a side wall opposed to said one of said housing end wall, a peripheral portion adjacent said housing end wall, and an additional draining conduit being closed at its first extremity and having a first portion and a second portion which is in fluid communication with said shaft conduit at a second extremity of said draining conduit, said opposed side wall being provided with a plurality of bores extending therethrough, one of said rotor side wall provided with perforations being mounted on said opposed side wall, said first portion of said draining conduit being in fluid communication with said perforations, said bores being in fluid communication with said perforations and said draining conduit first conduit and wherein said housing sealing means is a pair of seal assemblies respectively mounted on an inner surface of said cylindrical side walls in proximity to a respective end thereof, one of said seal assemblies being in contact with said additional draining means peripheral portion, an inner surface of said bore in said one of housing end walls being sealingly secured to said shaft.

27. An apparatus for extracting liquid from a humid mass as claimed in claim 1 comprising at least one additional pair of rotor side walls defining a concentrating channel open at its periphery in at least a portion thereof, at least one of said rotor side walls being provided with perforations, said rotor means being provided with at least one additional draining means comprising at least one draining conduit being closed at its first extremity and having a first portion in fluid communication with said perforations, and a second portion in fluid communication with said shaft conduit at its second extremity, said concentrating channel being in indirect communication with said outlet, whereby consistency of incoming humid mass into said concentrating channel is raised upon draining of said liquid.

28. An apparatus for extracting liquid from a humid mass as claimed in claim 27 comprising at least one rotor side wall scraper means secured to said housing adjacent at least one of said rotor side walls, said side wall scraper means having a scraping edge in contact with said rotor side wall whereby accumulation on said outer rotor side wall of substantially high consistency humid matter obtained through liquid extraction can be removed by said side wall scraper means upon rotation of said rotor means.

29. An apparatus for extracting liquid from a humid mass comprising:
 a cylindrical housing having a first and a second end wall and a cylindrical side wall;
 at least one inlet for admitting said humid mass in said housing;
 means for forcing said humid mass into said inlet;
 a rotor means having at least one pair of rotor side walls joined to a bottom wall defining an extracting channel open at its periphery in at least a portion thereof, at least one of said rotor side walls being provided with perforations, said rotor means having a central shaft for rotation with respect to said housing, at least one of said rotor side walls being moved upon rotation of said central shaft, said shaft having a conduit extending longitudinally therethrough, said rotor means being provided with at least one draining disc comprising two opposed side walls adjacent a peripheral portion, at least one opposed side walls being provided with a plurality of bores extending therethrough, said rotor side wall provided with perforations being mounted on said at least one draining disc side wall provided with a plurality of bores, said bores being in fluid communication with said perforations and said at least one draining conduit;
 drive means connected to said shaft for rotating said rotor means;
 means providing an alternative to seal along the entire length of said extracting channel, including a peripheral wall mounted on an internal surface of said cylindrical wall for substantially closing said extracting channel at its periphery in at least a portion thereof, sealing means mounted on said peripheral wall, said sealing means being in contact with said peripheral portion whereby preventing humid matter in said extraction channel from escaping therefrom at the junction of said peripheral wall and peripheral portion while preventing humid mass in said housing from flowing into said extraction channel through said junction, and housing sealing means for preventing said humid mass from escaping said housing;
 at least one outlet for discharging humid mass containing a reduced percentage of liquid therein upon rotation of said rotor means, said discharging channel being in direct communication with said outlet, said peripheral wall extending to said outlet, said outlet being provided with a restricting means for creating an axial pressure against humid mass being discharged whereby discharging of said humid mass containing a reduced percentage of liquid therein can be controlled; and
 a scraper means adjacent said outlet, said scraper means having a scraping edge being in contact with an external surface of said bottom wall.

30. An apparatus for extracting liquid from a humid mass as claimed in claim 29 wherein said rotor side walls extend substantially perpendicularly of the longitudinal axis of said shaft and are spaced apart in a substantially parallel relationship.

31. An apparatus for extracting liquid from a humid mass as claimed in claim 29 wherein at least one of said rotor side walls is inclined outwardly at an angle of about 1 to 10 degrees, whereby the transversal section area of said channel increases along said rotor side wall towards a periphery of said channel.

32. An apparatus for extracting liquid from a humid mass as claimed in claim 29 wherein said peripheral wall is provided with a recess facing a central portion of an outer surface of said draining disc peripheral portion, said recess extending along the entire length of said peripheral wall, said draining disc peripheral portion having means for tearing out of said recess humid matter accumulated therein.

33. An apparatus for extracting liquid from a humid mass as claimed in claim 29 wherein said first housing end wall is provided with a first bore, said second housing end wall being provided with a second bore, said shaft extending in said housing from said first bore through said second bore.

34. An apparatus for extracting liquid from a humid mass as claimed in claim 33 wherein said housing sealing means is a pair of seal assemblies respectively mounted on an inner surface of said first and second bores, said first seal assemblies being in contact with said shaft, said shaft being in rotation with respect to said housing end walls.

35. An apparatus for extracting liquid from a humid mass as claimed in claim 33 wherein said housing sealing means is a pair of seal assemblies respectively mounted on inner surface of said cylindrical side walls in proximity to a respective end thereof, said seal assemblies being in contact with an outer edge of a respective end wall of said housing, inner surface of said bores in said end walls being sealingly secured to said shaft.

36. An apparatus for extracting liquid from a humid mass as claimed in claim 33 wherein at least one of said draining disc side walls faces one of said housing end walls whereby delimiting a space therebetween in which incoming humid mass circulates, said space being in indirect communication with said outlet.

37. An apparatus for extracting liquid from a humid mass as claimed in claim 36 wherein said rotor means comprises an outer rotor side wall provided with perforations and mounted on said draining disc side wall facing one of said housing end walls, said draining disc side wall having a plurality of bores extending therethrough, said bores being in fluid communication with said perforations, said perforations being in fluid communication with a first portion of said draining means, whereby consistency of incoming humid mass into said space is raised upon draining of said liquid.

38. An apparatus for extracting liquid from a humid mass as claimed in claim 37 comprising at least one rotor side wall scraper means secured to said housing, said side wall scraper means having a scraping edge in contact with said outer rotor side wall whereby accumulation on said outer rotor side wall of substantially high consistency humid matter obtained through liquid extraction can be removed by said side wall scraper means upon rotation of said rotor means.

39. A method for extracting liquid from a humid mass comprising the steps of:
(a) providing a cylindrical housing having a first and a second end wall and a cylindrical side wall, at least one inlet for admitting said humid mass into said housing, rotor means having at least one pair of rotor side walls joined to a bottom wall defining a channel open at its periphery in at least a portion thereof, at least one of said rotor side walls being provided with perforations, said rotor means having a central shaft for rotation with respect to said housing, at least one of said rotor side walls being moved upon rotation of said central shaft, sad shaft having a conduit extending longitudinally therethrough, said rotor means being provided with at least one draining means comprising at least one of draining conduit being closed at its first extremity and having a first portion in fluid communication with said perforations and a second portion in fluid communication with said shaft conduit at its second extremity, means providing an alternative to seal along the entire length of said extracting channel, including a peripheral wall mounted on an internal surface of said cylindrical wall for substantially closing said extracting channel at its periphery in at least a portion thereof, sealing means mounted on said peripheral wall, said sealing means being in contact with a peripheral portion of said draining means, and housing sealing means for preventing said humid mass from escaping said housing, and at least one discharging outlet being in direct communication with said extracting channel, said peripheral wall extending to said outlet;
(b) admitting said humid mass into said housing through said inlet;
(c) rotating said rotor means about a longitudinal axis of said shaft causing extraction of liquid from humid mass into said channel through perforations in at least one of said pair of rotor side walls;
(d) draining said extracted liquid toward said shaft conduit for withdrawing said liquid; and
(e) discharging humid mass containing a reduced percentage of liquid thereon through said discharging outlet.

40. A method for extracting liquid from a humid mass as claimed in claim 39 wherein said admitting and draining steps are performed by pumping said humid mass upstream of said inlet.

41. A method for extracting liquid from a humid mass as claimed in claim 39 wherein said admitting and draining steps are performed by pumping said extracted liquid through said shaft conduit downstream of said inlet.

42. A method for extracting liquid from a humid mass as claimed in claim 39 wherein said admitting and draining steps are performed by a at least one feeding screw.

43. A method for extracting liquid from a humid mass as claimed in claim 39 wherein said step of discharging humid mass is performed by providing a restriction on said discharging humid mass at said outlet for creating an axial pressure against said humid mass to be discharged whereby output of said humid mass contains a reduced percentage of liquid therein and can be controlled.

* * * * *